United States Patent [19]
Elm et al.

[11] Patent Number: 5,916,282
[45] Date of Patent: Jun. 29, 1999

[54] SWITCH CABINET DOOR LOCK

[75] Inventors: Oskar Elm, Dietzhölztal; Udo Münch, Sinn; Thomas Weber, Herborn, all of Germany

[73] Assignee: Rittal-Werk Rudolf Loh GmbH & Co. KG, Herborn, Germany

[21] Appl. No.: 08/930,671

[22] PCT Filed: Mar. 27, 1996

[86] PCT No.: PCT/EP96/01342

§ 371 Date: Sep. 30, 1997

§ 102(e) Date: Sep. 30, 1997

[87] PCT Pub. No.: WO96/31674

PCT Pub. Date: Oct. 10, 1996

[30] Foreign Application Priority Data

Apr. 1, 1995 [DE] Germany ............................ 195 12 280

[51] Int. Cl.[6] ..................................................... E05B 13/02
[52] U.S. Cl. ................................. 70/423; 70/427; 70/455; 70/DIG. 63
[58] Field of Search ............................... 70/DIG. 63, 423, 70/427, 428, 455, DIG. 30, 78, 424, 425, 426

[56] References Cited

U.S. PATENT DOCUMENTS

| | | | |
|---|---|---|---|
| 1,078,156 | 11/1913 | Locher | 70/427 |
| 2,702,468 | 2/1955 | Spain | 70/455 |
| 3,857,264 | 12/1974 | Fowler | 70/423 |
| 4,073,165 | 2/1978 | Grundstrom et al. | 70/371 |
| 4,227,388 | 10/1980 | Nigrelli et al. | 70/427 |
| 4,631,938 | 12/1986 | Johnson | 70/209 |
| 4,793,165 | 12/1988 | Rochman | 70/284 |
| 4,838,059 | 6/1989 | Johnson | 70/209 |
| 4,884,424 | 12/1989 | Meyer | 70/427 |
| 5,063,766 | 11/1991 | Appelbaum | 70/428 |
| 5,203,187 | 4/1993 | Kane | 70/455 |
| 5,555,752 | 9/1996 | Fitzpatrick | 70/159 |
| 5,560,235 | 10/1996 | Aucoin | 70/455 |

*Primary Examiner*—Steven Meyers
*Assistant Examiner*—Clifford B. Vaterlaus
*Attorney, Agent, or Firm*—Jansson, Shupe, Bridge & Munger, Ltd.

[57] ABSTRACT

The invention relates to a catch for a door, especially a switchboard door, with a lock plate which can be secured to the door and bears a door lock and a bolt cover guided adjustably on the lock plate which can be secured in a position covering the door lock by means of a cover lock. Complete sealing with substantially increased security against unauthorized access to the door lock is attained in that the door lock takes the form of a casement lock and the cover lock that of a cylinder lock, a partial cover is secured to the lock plate which overlaps with the bolt cover in the locked position at the contact point and forms a sealed lock cover, and a cover for the cylinder lock is rotatably fitted on the bolt cover.

9 Claims, 3 Drawing Sheets

SWITCH CABINET DOOR LOCK

FIELD OF THE INVENTION

This invention is related generally to door locks and, more particularly, to door locks for a switch door cabinet.

BACKGROUND OF THE INVENTION

This type of lock is known from DE 86 05 436 U1. This known lock serves to make access to the door lock depend on authorization and to protect it from the influence of weather. This is not accomplished optimally by using the illustrated design, since the cover lock is always exposed and there is not sufficient security with regard to unauthorized access.

OBJECTS OF THE INVENTION

It is an object of this invention to provide a lock for a switch door cabinet overcoming some of the problems and shortcomings of devices of the prior art.

Another object of this invention is to provide a lock for a switch door cabinet that increases security fundamentally with regard to unauthorized access.

Still another object of the invention is to provide a lock for a switch door cabinet that is adequately protected from the influences of the weather. How these and other important objects are accomplished will be apparent from the following descriptions and from the drawings.

SUMMARY OF THE INVENTION

The invention involves a locking mechanism for a switch cabinet door comprised of: (1) a door; (2) a lock plate, connected to the door, said lock plate having both a door lock upon it and a hole; (3) a first cover portion adjustably mounted on the lock plate and moveable thereon between a closed position covering the door lock and an open position exposing the door lock; (4) a cover lock for locking the first cover portion in the closed position; (5) a second cover portion affixed with respect to the lock plate and overlapping the first cover portion in its closed position; and (6) a lock shield supported on the first cover portion.

In a particular embodiment of the invention, the door lock is constructed as a turnbuckle lock and the cover lock is constructed as a lock cylinder. In a specific version of this embodiment, the lock shield is capable of rotating. In a more specific version of the embodiment, the turnbuckle lock is lodged in a lock cabinet that has an upper and lower side. The lock cabinet is inserted in the hole of the lock plate and the cover lock has a locking element that locks at the upper side of the lock cabinet when the first cover portion is in the closed position.

In another embodiment of the invention, the second cover portion is integrally molded to the lock plate.

In a preferred embodiment of the invention, the lock cylinder is restrained by a wall so as not to rotate in the first cover portion. In still another preferred embodiment, a first cross piece is molded on to the second cover portion, a second cross piece is molded on to the first cover portion and the first cross piece and second cross piece fit together when the first cover portion is in the closed position.

In a more preferred embodiment of the invention, the lock plate contains at least one lateral groove and the first cover portion has at least one guide piece that engages the lateral groove. In a specific version of this embodiment, a stop pin is inserted in a lateral groove on the lock plate, the guide piece contains a recessed indentation and the stop pin and indentation fix the first cover portion on the lock plate while allowing movement between the closed and open position.

In still another preferred embodiment of the invention, the first cover portion has an opening in one of its lateral walls and a cover is attached over the opening. The lock cylinder is positioned in the first cover portion such that its long axis is parallel to the door (and horizontal) and the lock cylinder is accessible through the opening in the lateral wall of the first cover portion.

In yet another preferred embodiment of the invention, a fastening screw attaches the lock plate to the door, a fastening screw extends into the first cover portion, the first cover portion includes a stop and the fastening screw and the stop secure the first cover portion in the open position. In a specific version of this embodiment, the fastening screw attaches the second cover portion to the door.

BRIEF DESCRIPTIONS OF THE PREFERRED EMBODIMENTS

The lock shown in FIGS. 1 to 4 is fundamentally more suitable for granting authorized access by using a lock cylinder as a security lock, since a corresponding security key is required. The use of semi profile cylinders according to DIN 18254 is possible.

Figure 1:
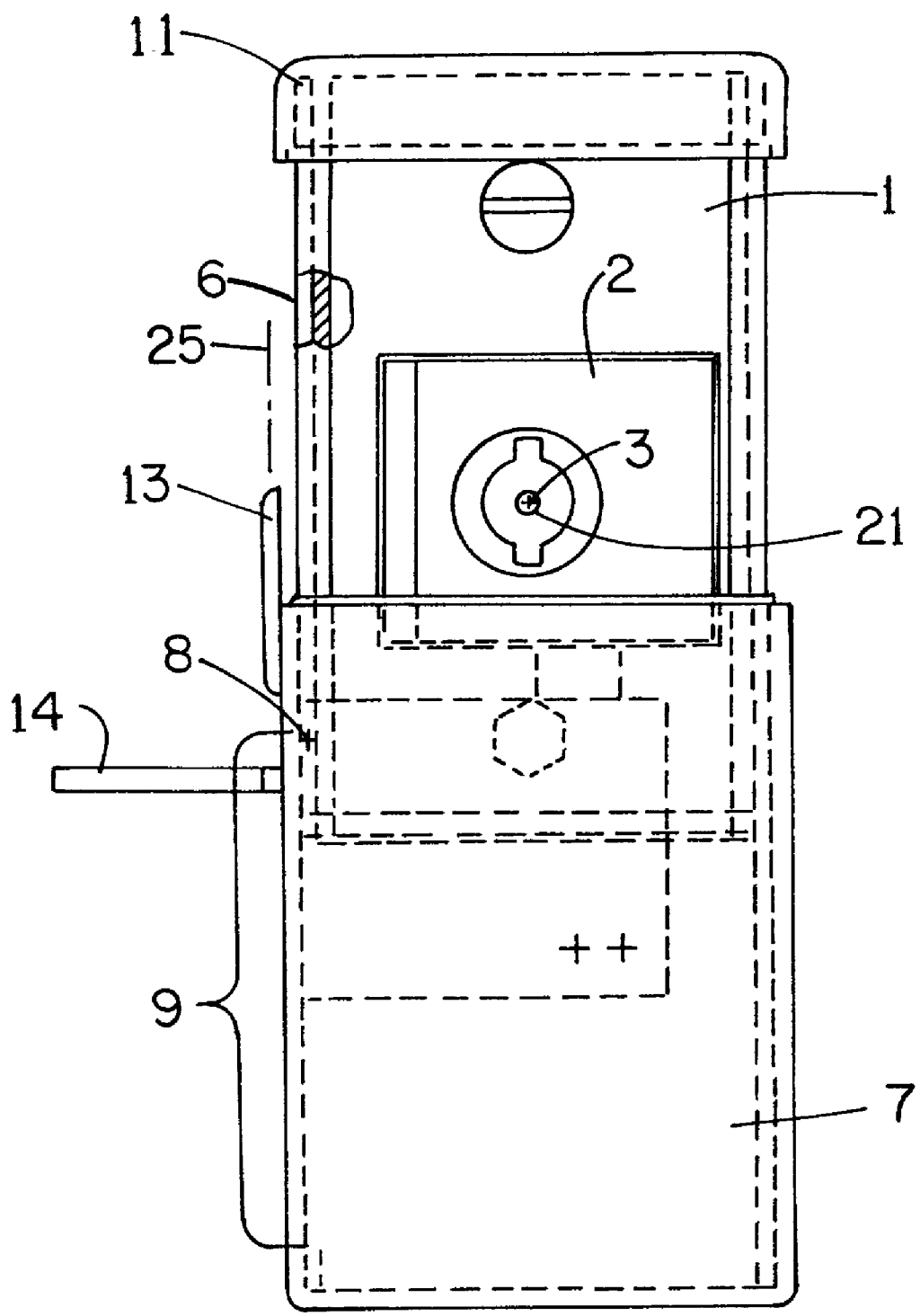
FIG. 1 is a top view of a lock with the slide cover in the open position.
Figure 2:
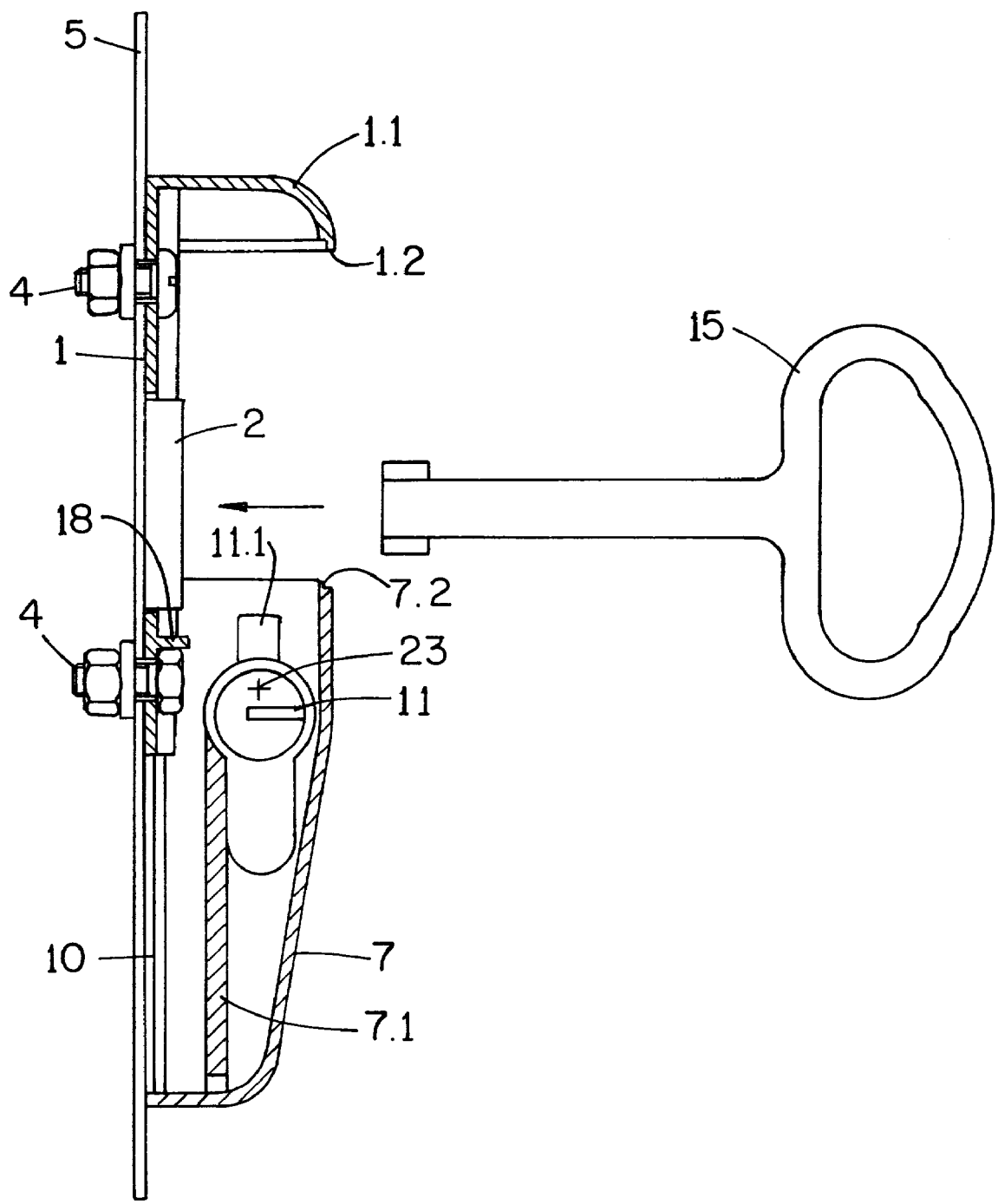
FIG. 2 is a longitudinal section through the lock according to FIG. 1 whereby the section plane extends perpendicular to the lock plate.

As can be derived in particular from FIG. 1 and FIG. 2, a lock plate 1 is connected to the door 5 by means of two screw joints 4. This lock plate 1, as a lower part of the lock, bears a part cover 1.1 which is advantageously molded onto lock plate 1. In a hole 12 (FIG. 4) of lock plate 1 there is a lock cabinet 2 that receives the turn-buckle lock 3 and that projects from the side facing away from the door 5.

Grooves 6 are formed on both vertical sides of the lock plate 1, into which a slide cover 7 with guide pieces 10 engages. As can be seen in FIG. 1, a stop pin 8 is inserted in the groove 6 on one side of the lock plate 1. This stop pin 8 is guided in a recess 9 of the guide piece 10, permitting an adjustment of the slide cover 7 from the open position into the lock position. The stop pin 8 fixes the slide cover 7 to the lock plate so that it does not get lost. This groove-spring connection between the slide cover 7 and the lock plate 1 forms a type of labyrinth seal and prevents the penetration of dust and water. A lock cylinder 11 is inserted in the slide cover 7 aligned along axis 23 parallel to the door and horizontal, so that the structural height of the lock can be kept low. A wall 7.1 of the slide cover 7 thereby fixes the lock cylinder 11 so that it cannot rotate. The front faces of part cover 1.1 and slide cover 7 form a contact point which, as the molded cross pieces 1.2 and 7.2 show, also form a seal when the slide cover 7 is brought into its lock position. A closed cover of the lock is thereby achieved. The access to the lock cylinder 11 is thereby covered and protected by a covering 13 supported so as to rotate on the slide cover 7 and in a plane 25 perpendicular to the door 5.

The turnbuckle type door lock 3 extends along first axis 21 (which is perpendicular to the door 5) and can be activated by means of a key 15 when the slide cover 7 is opened.

Figure 4:
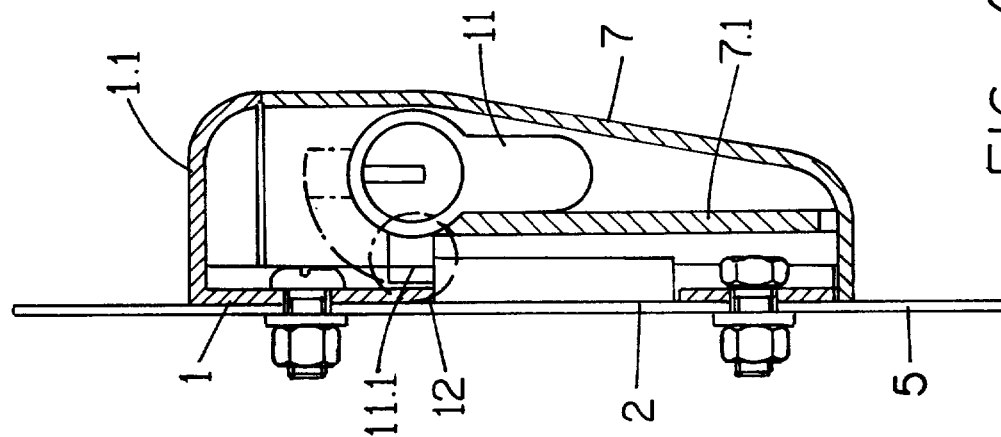
FIG. 4 is a longitudinal section corresponding to FIG. 2, through the lock in the position according to FIG. 3.
Figure 3:
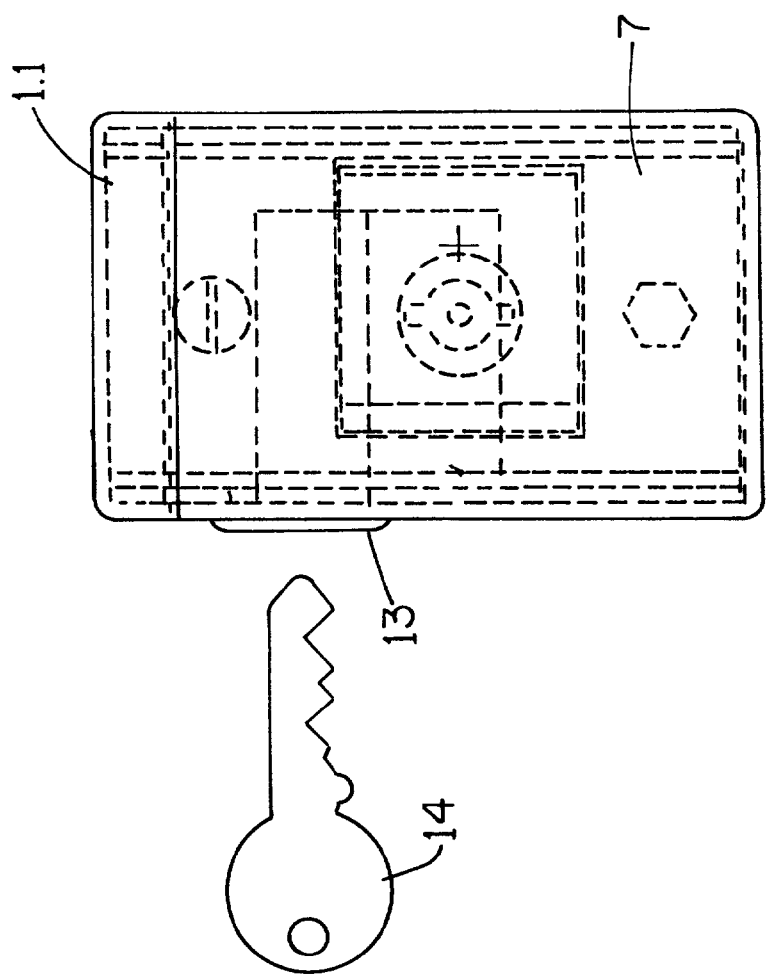
FIG. 3 is a top view of the lock with the slide cover in the lock position.

If, as FIGS. 3 and 4 show, the slide cover 7 is brought to its lock position, then the lock element 11.1 of the lock cylinder 11 can be rotated into the position as shown in FIG. 4 and engages behind the lock cabinet 2 such that the slide cover 7 can no longer be adjusted downward. Part cover 1.1 and slide cover 7 overlap in the area of the cross pieces 1.2 and 7.2 and seal off the contact point. The lock can only be opened by an authorized person who has a security key 14. Only if the lock element 11.1 of the lock cylinder 11 is again turned back can the slide cover 7 be moved into the open position. Access to the turnbuckle lock 3 is then available.

Fixing the slide cover so that it cannot get lost can also be achieved such that a screw on the inside of the door, in particular fastening screw 4, is used to fasten the lock plate 1 and/or the part cover 1.1. The fastening screw 4 then projects into the slide-cover 7 and acts together with a stop 18 secured inside the first cover member such that the slide-cover 7 is fixed to the lock so that it cannot get lost.

While the principles of this invention have been described in connection with specific embodiments, it should be understood clearly that these descriptions are made only by way of example and are not intended to limit the scope of the invention.

What is claimed:

1. A locking mechanism comprising:

door;

a lock plate connected to the door and having a hole, the lock plate having a turnbuckle door lock thereon;

a first cover portion adjustably mounted on the lock plate and movable thereon between a closed position covering the door lock and an open position exposing the door lock;

a cylinder cover lock for locking the first cover portion in the closed position;

a second cover portion affixed with respect to the lock plate and overlapping the first cover portion in its closed position; and a lock shield supported on the first cover portion;

and wherein:

the turnbuckle door lock is lodged in a lock cabinet having an upper and a lower side;

the lock cabinet is inserted in the hole of the lock plate; and the cover lock has a locking element that locks at the upper side of the lock cabinet when the first cover portion is in the closed position.

2. The locking mechanism of claim 1 wherein the lock shield is mounted for rotation in a plane perpendicular to the switch cabinet door.

3. The locking mechanism of claim 1 wherein the second cover portion is integrally molded to the lock plate.

4. The locking mechanism of claim 1 wherein the cylinder of the cover lock is restrained by a wall so as not to rotate in the first cover portion.

5. The locking mechanism of claim 1 wherein:

a first cross piece is molded to the first cover portion;

a second cross piece is molded to the second cover portion; and the first cross piece and second cross piece fit together when the first cover portion is in the closed position.

6. The locking mechanism of claim 1 wherein:

the lock plate contains at least one lateral groove; and the first cover portion has at least one guide piece that engages the lateral groove.

7. The locking mechanism of claim 6 wherein:

a stop pin is inserted in the lateral groove on the lock plate;

the guide piece contains a recessed indentation; and the stop pin and indentation fix the first cover portion on the lock plate while allowing movement between the open and closed positions.

8. The locking mechanism of claim 1 wherein:

the first cover portion has at least one lateral wall having an opening;

the lock shield is attached over the opening;

a lock cylinder of the cylinder cover lock has a long axis;

the lock cylinder is positioned in the first cover portion such that its long axis is substantially parallel to the door and substantially horizontal; and the lock cylinder is accessible through the opening in the lateral wall of the first cover portion.

9. The locking mechanism of claim 1 wherein a fastening screw attaches the lock plate to the door;

the fastening screw extends into the first cover portion;

the first cover portion includes a stop; and the fastening screw and the stop secure the first cover portion in the opened position.

\* \* \* \* \*